United States Patent
Haynes et al.

(10) Patent No.: US 11,819,954 B2
(45) Date of Patent: Nov. 21, 2023

(54) SYSTEMS AND METHODS FOR WIRE DEPOSITED ADDITIVE MANUFACTURING USING TITANIUM

(71) Applicant: GOODRICH CORPORATION, Charlotte, NC (US)

(72) Inventors: Noel C. Haynes, Etobicoke (CA); Eric Goldring, Milton (CA); Karthik Narayan, Milton (CA)

(73) Assignee: GOODRICH CORPORATION, Charlotte, NC (US)

( * ) Notice: Subject to any disclaimer, the term of this patent is extended or adjusted under 35 U.S.C. 154(b) by 193 days.

(21) Appl. No.: 16/933,683

(22) Filed: Jul. 20, 2020

(65) Prior Publication Data

US 2020/0384537 A1 Dec. 10, 2020

Related U.S. Application Data

(62) Division of application No. 16/259,758, filed on Jan. 28, 2019, now abandoned.

(51) Int. Cl.
*B22F 3/24* (2006.01)
*B22F 3/105* (2006.01)
(Continued)

(52) U.S. Cl.
CPC .......... *B23K 35/0261* (2013.01); *B22F 3/24* (2013.01); *B22F 10/64* (2021.01); *B22F 10/28* (2021.01);
(Continued)

(58) Field of Classification Search
CPC ...... B22F 3/1055; B22F 3/24; B22F 2301/40; B22F 2003/248; B22F 2201/20;
(Continued)

(56) References Cited

U.S. PATENT DOCUMENTS 6,077,369 A * 6/2000 Kusano ................. B23P 15/002
148/645
2014/0060138 A1* 3/2014 Hebda ..................... C22F 1/183
72/200
(Continued)

FOREIGN PATENT DOCUMENTS

GB 2489244 9/2012

OTHER PUBLICATIONS

"Development of Ti-6Al-4V and Ti-1Al-8V-5Fe Alloys Using Low-Cost TiH2 Powder Feedstock", Joshi et al., Journal of Materials Engineering and Performance, vol. 22(4), Apr. 2013, pp. 995-1003 (Joshi) (Year: 2013).*
(Continued)

*Primary Examiner* — Humera N. Sheikh
*Assistant Examiner* — Kevin Ct Li
(74) *Attorney, Agent, or Firm* — SNELL & WILMER L.L.P.

(57) ABSTRACT

A metallic part is disclosed. The part may comprise a functionally graded monolithic structure characterized by a variation between a first material composition of a first structural element and a second material composition of at least one of a second structural element. The first material composition may comprise an alpha-beta titanium alloy. The second material composition may comprise a beta titanium alloy.

13 Claims, 5 Drawing Sheets

(51) Int. Cl.
*B23K 35/02* (2006.01)
*B22F 10/64* (2021.01)
*B33Y 10/00* (2015.01)
*B33Y 70/00* (2020.01)
*B22F 10/28* (2021.01)

(52) U.S. Cl.
CPC ..... *B22F 2003/248* (2013.01); *B22F 2201/20* (2013.01); *B22F 2301/205* (2013.01); *B22F 2301/40* (2013.01); *B22F 2998/10* (2013.01); *B33Y 10/00* (2014.12); *B33Y 70/00* (2014.12)

(58) Field of Classification Search
CPC ........... B22F 2301/205; B22F 2998/10; B33Y 70/00; B33Y 10/00
See application file for complete search history.

(56) References Cited

U.S. PATENT DOCUMENTS

| | | | | |
|---|---|---|---|---|
| 2014/0332124 | A1* | 11/2014 | Takahashi | C22F 1/00 148/411 |
| 2017/0165751 | A1* | 6/2017 | Buller | B29C 64/35 |
| 2017/0306449 | A1 | 10/2017 | Lin et al. | |
| 2018/0154437 | A1* | 6/2018 | Mark | B22F 1/142 |
| 2018/0200798 | A1 | 7/2018 | Sharon et al. | |
| 2018/0216658 | A1 | 8/2018 | Brown et al. | |
| 2018/0228616 | A1 | 8/2018 | Piecuch | |
| 2018/0245186 | A1* | 8/2018 | Welk | B23K 35/325 |

OTHER PUBLICATIONS

USPTO, Election/Restriction Requirement dated Jul. 9, 2019 in U.S. Appl. No. 16/259,758.
USPTO, Non-Final Office Action dated Oct. 10, 2019 in U.S. Appl. No. 16/259,758.
USPTO, Final Office Action dated Mar. 20, 2020 in U.S. Appl. No. 16/259,758.
Joshi et al., "Development of Ti-6Al-4V and Ti-1Al-8V-5Fe Alloys Using Low-Cost TiH2 Powder Feedstock", Journal of Materials Engineering and Performance, vol. 22(4), Apr. 2013, pp. 995-1003 (Joshi) (Year: 2013).
Hamid Azizia,cet al., https://www.sciencedirect.com/science/article/pii/S2214860417306140 "Additive manufacturing of a novel Ti-Al-V-Fe alloy using selective laser melting," Additive Manufacturing, vol. 21, May 2018, pp. 529-535.
European Patent Office, European Search Report dated Apr. 17, 2020 in Application No. 19210340.6.
Wang et al., "Microstructure study of direct laser fabricated Ti alloys using powder and wire", Applied Surface Science, Elsevier, Amsterdam, NL, vol. 253, No. 3, Nov. 11, 2006 (Nov. 11, 2006), pp. 1424-1430, XP005760098.
Curt Lavender et al: "2011 DOE Hydrogen and Fuel Cells and Vehicle Technologies Programs Annual Merit Review Low Cost Titanium-Propulsion Applications", Mar. 11, 2011 (Mar. 11, 2011), XP055648462, Retrieved from the Internet: URL:https://www.energy.gov/sites/prod/files/2014/03/f11 / pm006_lavender_2011_o.pdf.

* cited by examiner

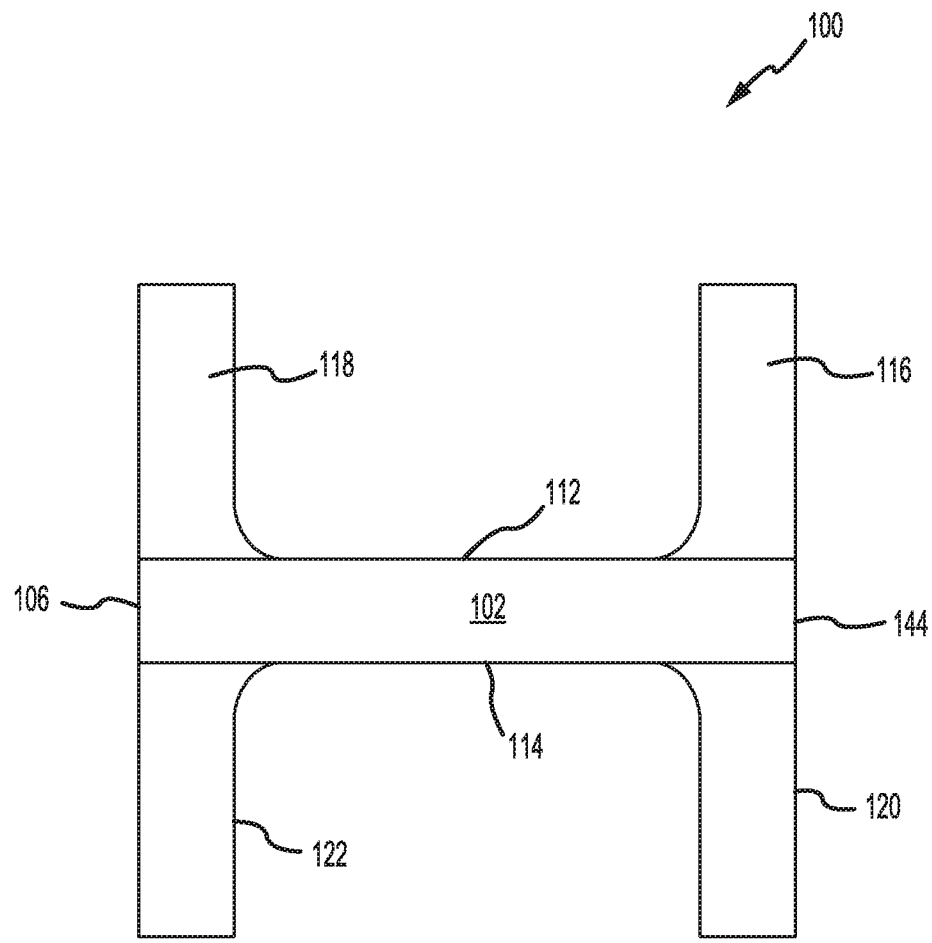
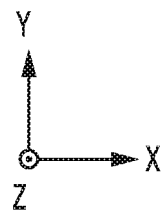
FIG.1B

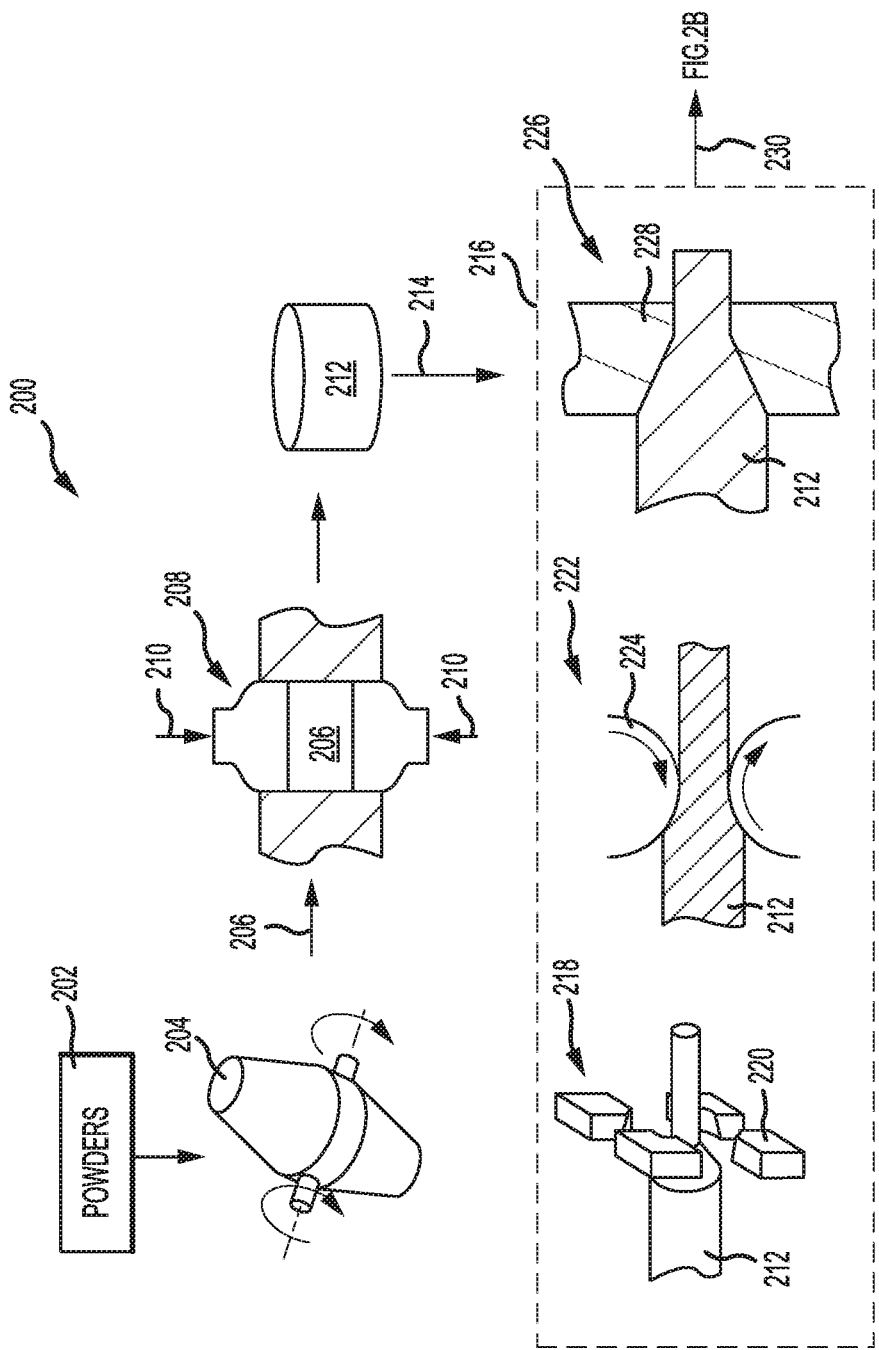

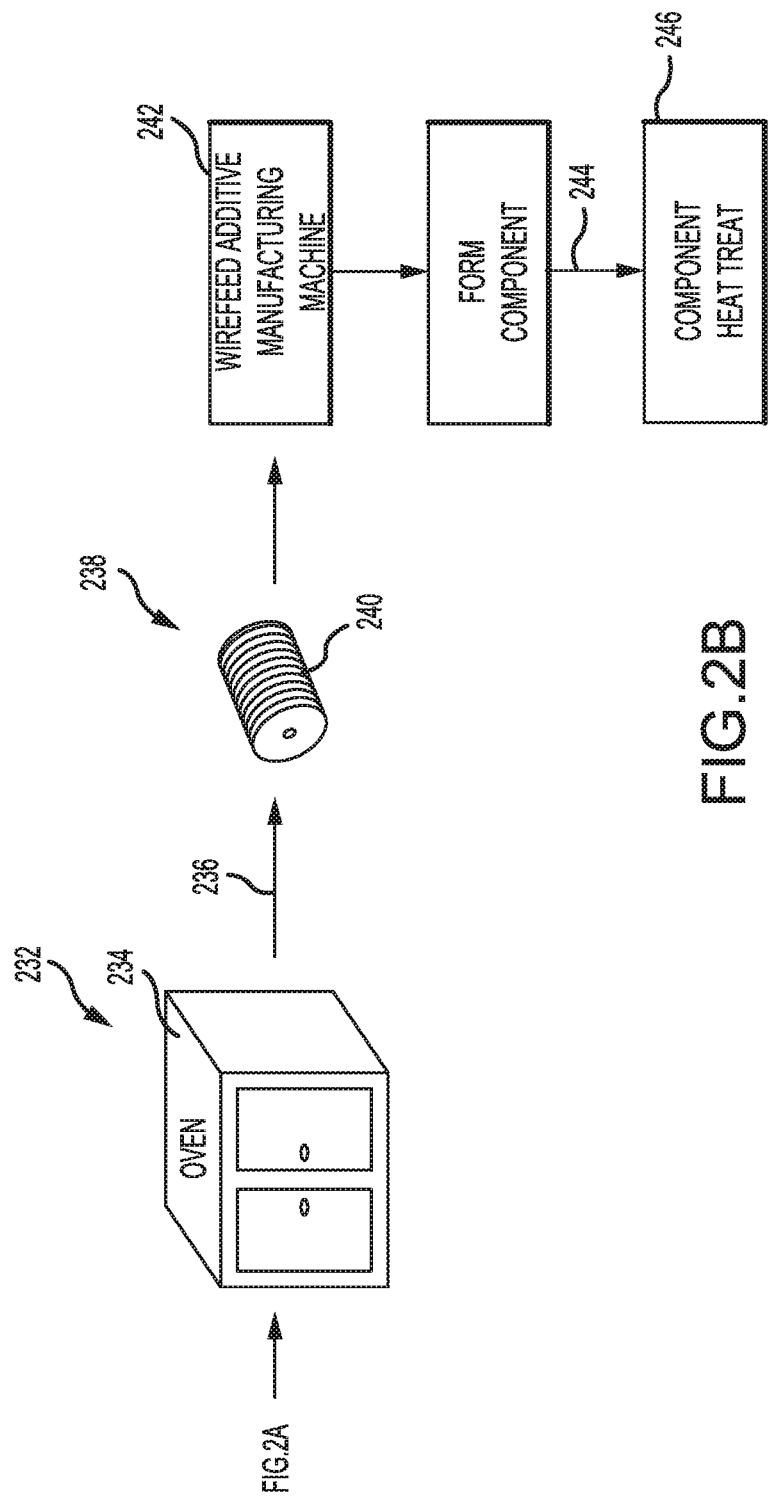

SYSTEMS AND METHODS FOR WIRE DEPOSITED ADDITIVE MANUFACTURING USING TITANIUM

CROSS REFERENCE TO RELATED APPLICATIONS

This application is a divisional of, claims priority to and the benefit of, U.S. patent application Ser. No. 16/259,758 filed on Jan. 28, 2019, and entitled "SYSTEMS AND METHODS FOR WIRE DEPOSITED ADDITIVE MANUFACTURING USING TITANIUM," which is incorporated by reference in its entirety.

FIELD

The disclosure generally relates to the manufacture of aerospace components using wires suitable for additive manufacturing and more particularly to the wires being produced by forming a sintered billet of titanium and other metallic powders.

BACKGROUND

Aircraft landing gear designs incorporate large structural components made from high strength titanium alloys. Powder based additive manufacturing techniques, such as powder bed, for titanium alloy landing gear components are unsuited for producing large parts. Wire deposition additive manufacturing techniques may be used to form large parts. However, existing wire feedstocks for titanium alloys tend to be high cost and tend to have reduced tensile and/or fatigue strength in comparison to wrought processed material.

SUMMARY

In various embodiments, a metallic part comprises a functionally graded monolithic structure characterized by a variation between a first material composition of a first structural element and a second material composition of a second structural element, wherein each of the first material composition and the second material composition comprises at least one of a titanium metal or an alloy.

In various embodiments, the first material composition comprises an alpha-beta titanium alloy. In various embodiments, the second material composition comprises a beta titanium alloy. In various embodiments, the second structural element is composed of a heat treated wire drawn from a sintered billet of powdered metals deposited integrally with the first structural element. In various embodiments, the sintered billet of powdered metals comprises between 4% and 6% by weight iron, between 0.5% to 2% by weight aluminum, and between 6% to 9% by weight vanadium. In various embodiments, the heat treated wire comprises between 0.25% and 0.50% by weight oxygen and between 0.001% and 0.015% by weight hydrogen. In various embodiments, the first structural element comprises a base plate having between 5.5% and 6.75% by weight aluminum and between 3.5% to 4.5% by weight vanadium. In various embodiments, the second structural element comprises a flange portion. In various embodiments, the first structural element and the second structural element defines one of a "C" shaped channel, a "T" shaped beam, an "S" shaped beam, an "I" shaped beam, an "H" shaped beam, or an "L" shaped beam.

In various embodiments, an article of manufacture including a metallic component comprising a functionally graded monolithic structure characterized by a variation between a first material composition of a first structural element and a second material composition of a second structural element, wherein each of the first material composition and the second material composition comprises at least one of a titanium metal or an alloy, wherein the second structural element is formed of a wire feedstock, wherein the wire feedstock comprising a heat treated wire drawn from a sintered billet of powdered metals, the powdered metals comprising titanium hydride, iron, vanadium, and aluminum.

In various embodiments, the first material composition comprises an alpha beta titanium alloy. In various embodiments, the second material composition comprises a beta titanium alloy. The sintered billet of powdered metals may comprise between 4% and 6% by weight iron, between 0.5% to 2% by weight aluminum, and between 6% to 9% by weight vanadium. The heat treated wire may comprise between 0.25% and 0.50% by weight oxygen and between 0.001% and 0.015% by weight hydrogen. In various embodiments, the heat treated wire is heat treated by at least one of annealing, solutionizing, or aging. In various embodiments, the heat treated wire may undergo at least one of a beta phase transformation, a beta anneal, or an alpha-beta anneal during the at least one of annealing, solutionizing, or aging.

In various embodiments, a method of additive manufacturing comprises mixing a plurality of powdered metals comprising titanium, iron, vanadium, and aluminum to produce a powder blend, cold isostatic pressing and sintering the powder blend to form a billet, performing a wire forming operation on the billet to produce a worked wire, heat treating the worked wire to produce a heat treated wire, loading a first structural element into an additive manufacturing machine, printing a second structural element of the heat treated wire integral to the first structural element to form a part, and heat treating the part to generate a functionally graded monolithic structure. In various embodiments, the titanium is a titanium hydride powder and the first structural element comprises a substantially Iron free Titanium alloy. In various embodiments, the powder blend comprises between 4% and 6% by weight iron, between 0.5% to 2% by weight aluminum, and between 6% to 9% by weight vanadium. In various embodiments, the sintering is performed between 900° F. and 1600° F. and under a vacuum.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 1B illustrates an additively manufactured part, in accordance with various embodiments;

FIG. 2A illustrates a method for titanium wire additive manufacturing, in accordance with various embodiments; and FIG. 2B illustrates a continuation of a method from FIG. 2A for titanium wire additive manufacturing, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Titanium alloy Ti-185 has a relatively high tensile strength; however, the high iron percentage of the alloy causes segregation during conventional melting. Stated another way, titanium alloys having iron compositions above 3% by weight tend to have an iron composition prone to segregation by conventional manufacture via melting. Powder metallurgy techniques such as, for example, pressing and sintering may overcome the segregation issues induced in conventional melt metallurgy, thereby enabling a lower cost part. Alloying powder may be either elemental powders (e.g., Ti, Fe, V, Al), master alloy powders, or a combination thereof. Sintered billets may be drawn or otherwise worked into a wire feedstock for additive manufacturing operations. In this regard, large, high strength titanium alloy components such as, for example, pistons, bogie beams, torque links, brake rods, and/or the like may be produced at reduced cost. Additionally, additive manufacturing according to the process described herein may tend to overcome macro segregation issues encountered in conventional melt metallurgy and benefit of enhanced fatigue and ultimate strength.

Figure 1A:
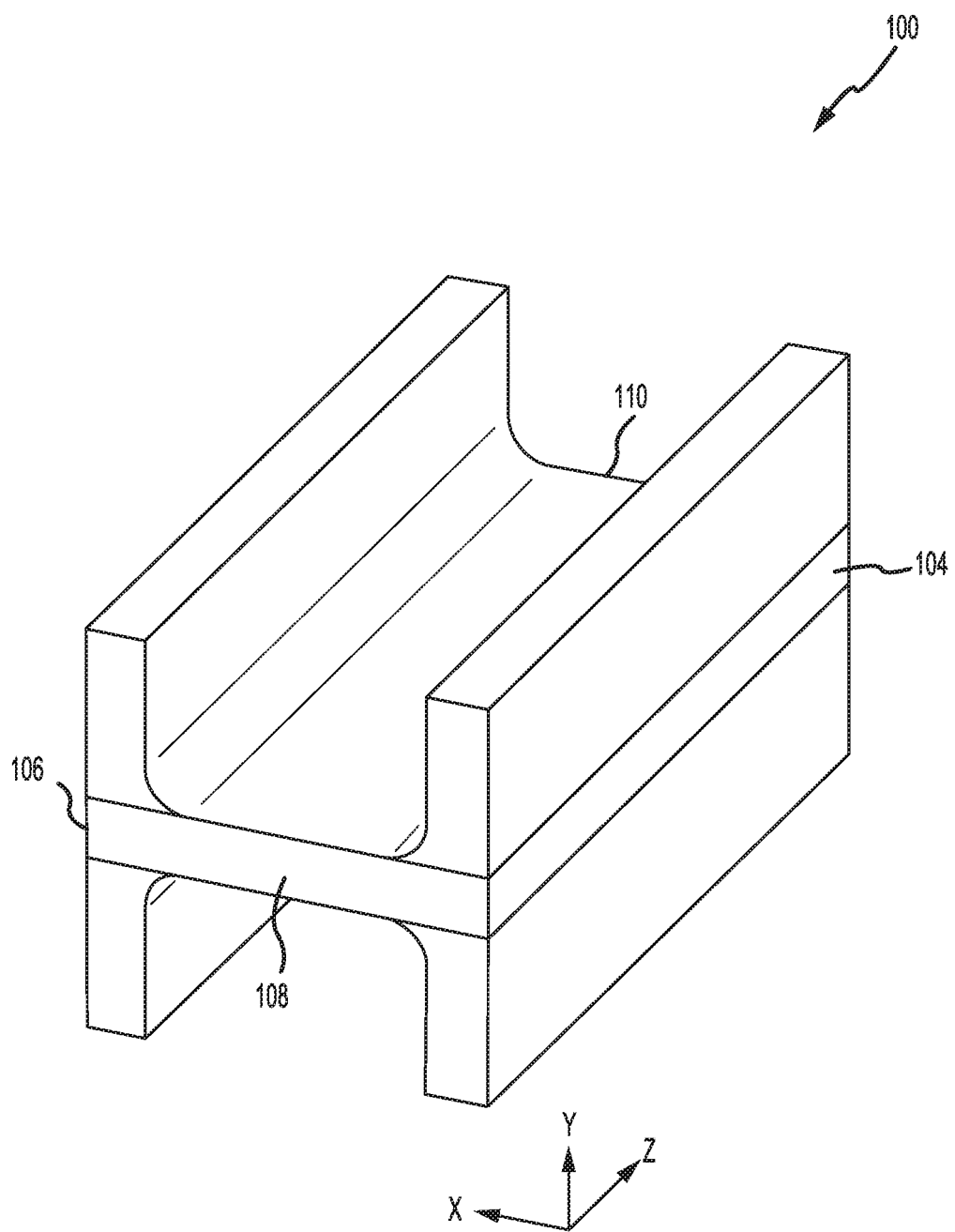
FIG. 1A illustrates an additively manufactured part, in accordance with various embodiments.

With reference to FIGS. 1A and 1B, an additively manufactured part 100 is illustrated with XYZ-axes provided for reference in perspective view as shown in FIGS. 1A and 1*n* cross section through the XY-plane as shown in FIG. 1B in accordance with various embodiments. Part 100 may comprises a functionally graded structure characterized by a variation in structural material composition between structural elements of a monolithic structure. In this regard, the monolithic structure may be tailored to the particular engineering design loads for each structural element as a function of the material composition of the structural element (i.e. functionally graded). Part 100 may comprise a first structural element such as a base plate 102. In various embodiments the first structural element may comprise one of a plate, a tube, a rod, or a hollow structure. Base plate 102 comprises a first metallic material such as one of a metal, an alloy, a titanium alloy, and/or the like. In various embodiments, the first structural element such as base plate 102 comprises an iron free titanium alloy, or substantially less iron free titanium alloy of up to 2.5 wt. % iron, or an alpha-beta titanium alloy such as, for example, Ti-64 alloy (Ti-6Al-4V) conforming to SAE AMS 4911 comprising aluminum at 5.5-6.75 wt. %, vanadium at 3.5-4.5 wt. %, yttrium at not more than 0.005 wt. %, iron at not more than 0.3 wt. %, carbon at not more than 0.08 wt. %, nitrogen at not more than 0.05 wt. %, hydrogen at not more than 0.015 wt. %, a total of other elements at not more than 0.4 wt. %, and with the balance of titanium. Base plate 102 may be a rectilinear plate comprising a first side 104, a second side 106, a third side 108, and a fourth side 110 defining a first face 112 and a second face 114. In various embodiments, base plate 102 may be of any alpha-beta alloy known to those skilled in the art where low material cost tends to be preferred over material strength.

In various embodiments, one or more second structural elements such as first 116, second 118, third 120, and fourth 122 flange portions may be formed from the base plate 102. Each of the second structural elements may comprise a second metallic material such as one of a metal, an alloy, a titanium alloy, and/or the like. In various embodiments, the flange portions (116, 118, 120, 122) comprise a titanium-iron alloy or a beta titanium alloy such as, for example, Ti-185 alloy (Ti-1Al-8V-5Fe) comprising aluminum at 0.8-1.5 wt. %, vanadium at 7.5-8.5 wt. %, iron at 4-6 wt. %, oxygen at 0.25-0.5 wt. %, nitrogen at not more than 0.070 wt. %, carbon at not more than 0.050 wt. %, and with the balance of titanium. Each of the second structural elements, such as the flange portions (116, 118, 120, 122), may be formed integrally with the first structural element, such as the base plate 102, via an additive manufacturing process. In various embodiments, the second structural elements may extend radially outward of the first structural element such as, for example, the tube and/or hollow shape. The additive manufacturing process may include one of selective laser melting, selective metal sintering, direct energy deposition, wire deposition, wire arc, and/or any suitable additive manufacturing process known to those in the art.

In various embodiments, one or more second structural elements may be configured to alter the shape of additively manufactured part 100 such as, for example, an "I" or "H" shaped beam as illustrated in FIGS. 1A and 1B. For example, part 100 may comprise base plate 102 having first flange portion 116 proximate first side 104 with second flange portion 118 proximate second side 106. Each of the first flange portion 116 and the second flange portion 118 may extend perpendicular to base plate 102 from first face 112. In this regard, additively manufactured part 100 may form a relatively "C" shaped channel. In another embodiment, additively manufactured part 100 may comprise base plate 102 having the first flange portion 116 and the third flange portion 120 proximate first side 104. The first flange portion may extend perpendicular to base plate 102 from first face 112 and the third flange portion 120 may extend perpendicular to base plate 102 from second face 114. In this regard, additively manufactured part 100 may form a relatively "T" shaped beam.

In various embodiments, additively manufactured part 100 may comprise base plate 102 having the first flange portion 116 proximate first side 104 and the fourth flange portion 122 proximate second side 106. The first flange portion may extend perpendicular to base plate 102 from first face 112 and the fourth flange portion 122 may extend perpendicular to base plate 102 from second face 114. In this regard, additively manufactured part 100 may form a relatively "S" shaped beam. In another embodiment, additively manufactured part 100 may comprise base plate 102 having the first flange portion 116 proximate first side 104. The first flange portion may extend perpendicular to base plate 102 from first face 112. In this regard, additively manufactured part 100 may form a relatively "L" shaped beam.

With additional reference to FIG. 2A, a method for titanium wire additive manufacturing is illustrated according to various embodiments. A plurality of powdered metals 202 comprising titanium and iron are added to powder blender 204 and blended to consistency to powder blend 206. In various embodiments, powder blend 206 may comprise titanium and iron and any of oxygen, aluminum, vanadium, and/or hydrogen. Powdered metals 202 may include titanium hydride powder. Powder blend 206 may be between 4% and 6% by weight iron, between 0.5% to 2% by weight aluminum, and between 6% to 9% by weight vanadium. The input powders may contain oxygen levels between 0.25% and 0.5% by weight and hydrogen levels up to 0.015% by weight or between 0.001% and 0.015% by weight. In various embodiments, powdered metals consist of Al—V master alloy and Fe elemental powder blended with $TiH_2$ powder. The billet elemental weight percent may be adjusted to account for vaporization of elements such as aluminum during the wire-fed additive process tending thereby to ensure the additive manufactured part is within a desired weight percent limit. In various embodiments, the billet shape may be a solid round or other shape as appropriate to input stock for wire drawing.

Powder blend 206 is loaded into sintering furnace 208 which applies force 210 to compact the powder blend 206 and heat to sinter the powder blend 206, thereby forming billet 212. In various embodiments, the powder blend 206 may be compressed by cold isostatic pressing to form a compressed shape prior to sintering. In various embodiments, sintering furnace 208 may be a vacuum sintering furnace and powder blend 206 may be compressed and heated under a vacuum. In various embodiments, the compressed powder blend 206 may be heated to between 900° F. [483° C.] and 1600° F. [871° C.] for the sintering operation. In this regard, the sintered billet may undergo beta phase transformation. Sintering the powder blend 206 may include removing gasses evolved from the powder blend 206 during sintering and sintering furnace 208 may include a gas removal system and/or control system. In various embodiments, oxygen, nitrogen, and/or hydrogen may be removed from the powder blend 206 during sintering. In various embodiments, billet 212 may undergo an annealing cycle subsequent to sintering and prior to wire forming operations 216. In various embodiments, the annealing cycle temperatures may be between 1200° F. [649° C.] and 1400° F. [760° C.].

Billet 212 may receive an initial anti-oxidation coating 214 prior to undergoing wire forming operations 216. In various embodiments, wire forming operations 216 may draw the billet 212 that has been sintered into a wire of a desired diameter. Wire forming operations 216 may include rotary swaging 218 via an array of swaging dies 220 which exert force circumferentially about billet 212, thereby reducing its diameter. Wire forming operations 216 may also include rolling 222 of billet 212 through rollers 224, thereby reducing its diameter. Additionally, wire forming operations 216 may include extruding 226 of billet 212 through die 228, thereby reducing its diameter. A plurality of wire forming operations 216 may be conducted repeatedly or sequentially as required to achieve a desired wire diameter for a worked wire 230. In various embodiments, the diameter of billet 212 may be reduced by wire forming operations 216 to a wire diameter between 0.0104 in [0.265 mm] and 0.156 in [4.0 mm]. In various embodiments, anti-oxidation coating 214 may be reapplied between successive wire forming operations 216 as rotary swaging 218, rolling 222, and extruding 226 tend to remove the coating. In various embodiments, the worked billet 212 may undergo a metal pickling treatment between wire forming operations 216. In this regard, scale formation on billet 212, impurity, and oxygen uptake of billet 212 are reduced. In various embodiments, any of wire forming operations 216 may be conducted in a vacuum or under an inert gas such as, for example, argon.

In various embodiments, worked wire 230 may undergo one or more heat treatment operations 232, for example, in a heat treat oven 234 between wire forming operations 216 (e.g., intermediate heat treatments) and/or when worked wire 230 has achieved the desired final diameter (e.g., final heat treatment) In this regard, crack formation and oxide formation during wire forming operations 216 may be reduced. Heat treatment operations may include solutionizing heat treatment, aging, and/or annealing. In various embodiments, heat treatments may include a beta anneal and an alpha beta anneal. For example, annealing between 1550° F. [843° C.] and 1600° F. [871° C.] or annealing between 1200° F. [649° C.] and 1400° F. [760° C.] or annealing between 1300° F. [705° C.] and 1350° F. [732° C.]. In various embodiments, a solutionizing heat treatment may be between 1350° F. [732° C.] and 1450° F. [788° C.]. In various embodiments, an aging heat treatment may be between 800° F. [427° C.] and 1100° F. [593° C.] or may be adjusted to achieve a desired material property for wire manufacture. In various embodiments, the heat treated wire may have between 0.001% and 0.015% by weight hydrogen and may have between 0.25% and 0.5% by weight oxygen.

Heat treated alloy wire 236 may be coiled 238 onto feed spools 240 and loaded in a wirefeed additive manufacturing machine 242 configured for heat treated alloy wire 236. Wirefeed additive manufacturing machine 242 may comprise hardware and/or software configured to perform additive manufacturing of an aerospace component. In various embodiments, wirefeed additive manufacturing may include laser wire metal deposition, electron beam additive manufacturing, wire arc additive manufacturing and/or the like. In various embodiments, wirefeed additive manufacturing machine 242 may be configured to deposit the heat treated wire on a substrate. For example, the wirefeed additive manufacturing machine 242 may be configured with a turntable, gantry style or rotating head and tailstock style. In various embodiments, the wirefeed additive manufacturing machine 242 may incorporate a single or a multiple wirefeed system and be capable of delivering the heat treated alloy wire 236 at a rate of of 0.5 in/min [1.27 cm/min] to 25 in/min [63.5 cm/min] and may have deposition rates between 1 and 20 lbs/hour [0.45 and 9 kg/hr]. Wirefeed additive manufacturing machine 242 may produce a metallic aerospace component 244 from heat treated alloy wire 236. Metallic aerospace component 244 may undergo a component heat treat process 245 similar to heat treatment operations 232.

Figure 3:
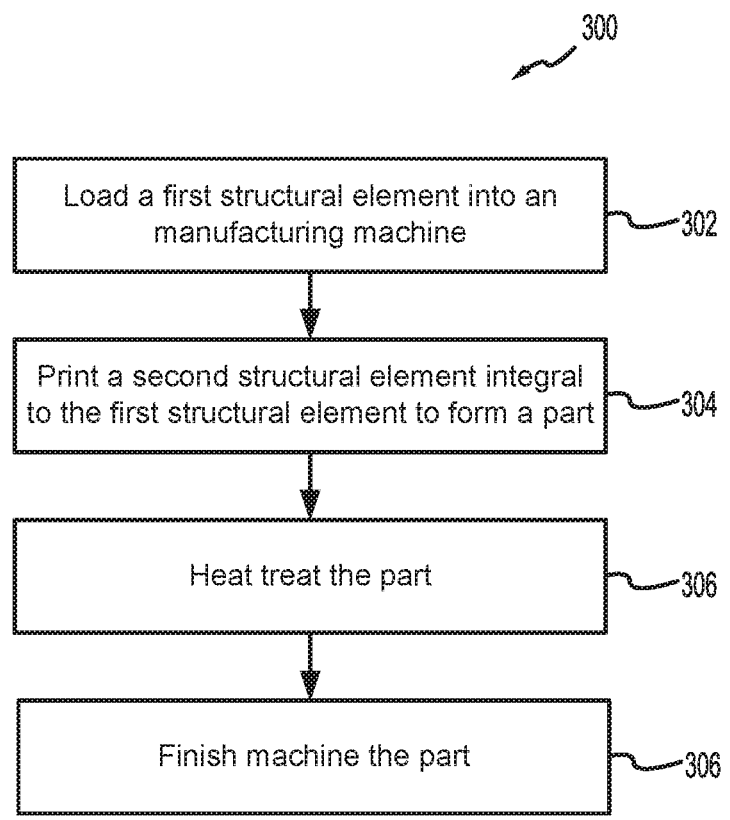
FIG. 3 illustrates a method of additive manufacturing, in accordance with various embodiments.

In various embodiments and with additional reference to FIG. 3, a method 300 of manufacturing a functionally graded metallic part is illustrated. Method 300 may include loading a first structural element into an additive manufacturing machine (step 302). For example, base plate 102 may be loaded in to wirefeed additive manufacturing machine 242. Method 300 includes printing a second structural element integral to the first structural element to form a part (step 304). For example, heat treated alloy wire 236 may be continuously deposited over first face 112 of plate 102 to form a flange portion such as, for example, first flange portion 116, of part 100. Method 300 may include heat treating the part (step 306) for example by one of annealing, solutionizing, or aging to generate a functionally graded monolithic structure. As will be appreciated by those skilled in the art, the functionally graded monolithic structure may benefit of as printed part heat treating and heat treating variables may be tailored in consideration of the first material composition and the second material composition. The heat treating temperature may tend to drive similar microstructural transformations, such as, for example overlapping the annealing temperatures. In one embodiment, for example incorporating a Ti-6Al-4V base plate and additive manufactured Ti-185 features having annealing temperatures of 1300° F. [705° C.] to 1650° F. [899° C.] and 1250° F. [677° C.] to 1350° F. [732° C.], respectively, the as printed structure may be annealed between 1300° F. [705° C.] and 1350° F. [732° C.]. Alternatively, the heat treating temperature may drive different microstructural transformations. In another embodiment, an alpha-beta annealing temperature of Ti-6Al-4V may serve as a beta annealing temperature for Ti-185, as the beta transus temperature for Ti-185 (1525° F. [830° C.]) is markedly different than for Ti-6Al-4V (1825° F. [996° C.]). Such a heat treatment may result in a functionally graded part having differing microstructures tailored for a desired structural performance of a part feature such as, for example, a Widmenstattan or lamella structure for one titanium alloy (e.g., the first material composition), and a mill annealed microstructure for the other (e.g., the second material composition). Method 300 may include finish machining the part (step 306) such as, for example, by a subtractive manufacturing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of additive manufacturing, comprising:
   mixing a plurality of powdered metals comprising titanium, iron, vanadium, and aluminum to produce a powder blend;
   cold isostatic pressing and sintering the powder blend to form a billet;
   performing a wire forming operation on the billet to produce a worked wire, wherein the wire forming operation includes extruding the billet through a die;
   heat treating the worked wire to produce a heat treated wire;
   coiling the heat treated wire onto a feed spool;
   loading a first structural element into an additive manufacturing machine, the first structural element having a first side, a second side, a first face, and a second face;
   loading the feed spool into the additive manufacturing machine;
   printing a second structural element of the heat treated wire from the feed spool, the second structural element being integral to the first structural element to form a part, wherein the second structural element is deposited over including depositing a first flange portion proximate the first side and extending perpendicular from the first face in a first direction; and
   heat treating the part to generate a functionally graded monolithic structure.

2. The method of claim 1, wherein the titanium is a titanium hydride powder and the first structural element comprises an Iron free Titanium alloy.

3. The method of claim 2, wherein the powder blend comprises
   4% to 6% by weight iron, 0.5% to 2% by weight aluminum, and 6% to 9% by weight vanadium.

4. The method of claim 3, wherein the sintering is performed at 900° F. to 1600° F. and under a vacuum.

5. The method of claim 1, wherein the wire forming operation includes rotary swaging via an array of swaging dies which exert force circumferentially about the billet, thereby reducing its diameter.

6. The method of claim 5, further comprising performing a plurality of wire forming operations repeatedly or sequentially.

7. The method of claim 6, further comprising applying an anti-oxidation coating to the billet prior to undergoing the wire forming operation.

8. The method of claim 7, further comprising reapplying the anti-oxidation coating between successive wire forming operations.

9. The method of claim 6, further comprising performing metal pickling treatment on the billet between wire forming operations.

10. The method of claim 1, wherein the printing the second structural element further includes depositing a second flange portion proximate the first side and extending perpendicular from the second face in a second direction opposite the first direction.

11. The method of claim 1, wherein the printing the second structural element further includes direction depositing a second flange portion proximate the second side and extending perpendicular from the first face in the first direction.

12. The method of claim 1, wherein the printing the second structural element further includes depositing a second flange portion proximate the first side and extending perpendicular from the second face in a second direction opposite the first direction, depositing a third flange portion proximate the second side and extending perpendicular from the first face in the first direction, and depositing a fourth flange portion proximate the second side and extending perpendicular from the second face in the second direction.

13. The method of claim 12, wherein the printing the second structural element integral to the first structural element forms an "I" shaped beam.

* * * * *